United States Patent [19]

Goto et al.

[11] Patent Number: 4,471,090

[45] Date of Patent: Sep. 11, 1984

[54] POWDERY COATING COMPOSITION

[75] Inventors: Jugo Goto, Kawanishi; Tsutomu Kubota, Otokuni, both of Japan

[73] Assignee: Takeda Chemical Industries, Ltd., Osaka, Japan

[21] Appl. No.: 454,552

[22] Filed: Dec. 30, 1982

Related U.S. Application Data

[63] Continuation of Ser. No. 259,610, May 1, 1981, abandoned.

[30] Foreign Application Priority Data

May 14, 1980 [JP] Japan ................................ 55/64502

[51] Int. Cl.$^3$ ...................... C08L 63/00; C08L 29/04
[52] U.S. Cl. ................................................... 525/58
[58] Field of Search ........................................... 525/58

[56] References Cited

U.S. PATENT DOCUMENTS

| | | | |
|---|---|---|---|
| 2,713,567 | 7/1955 | Scheibili | 525/58 |
| 3,269,974 | 8/1966 | Childs | 525/58 |
| 3,334,057 | 8/1967 | Marks | 525/58 |
| 3,400,098 | 9/1968 | Parry | 525/58 |
| 3,542,902 | 11/1970 | Dunion | 525/329 |
| 3,571,491 | 3/1971 | Markowski | 525/58 |
| 3,634,301 | 1/1972 | Fitzhugh | 525/58 |
| 3,652,712 | 3/1972 | Ahmed | 525/58 |
| 4,193,799 | 3/1980 | Crivello | 525/58 |
| 4,248,977 | 2/1981 | Wertz | 525/58 |

*Primary Examiner*—Paul Lieberman
*Attorney, Agent, or Firm*—Wenderoth, Lind & Ponack

[57] ABSTRACT

A powdery coating composition comprising (A) a carboxyl-modified product of a hydrolyzed polymer obtained by hydrolyzing a copolymer derived from a vinyl ester of a saturated monocarboxylic acid and a vinyl monomer polymerizable therewith and (B) a compound having not less than two epoxy groups in the molecule offers extremely tough coating films which are resistant to chemicals, water and salt spray.

11 Claims, No Drawings

POWDERY COATING COMPOSITION

This is a Continuation of application Ser. No. 259,610, filed May 1, 1981 abandoned.

The present invention relates to a powdery coating composition capable of forming a highly tough coating film. More particularly, the invention relates to a powdery composition for coating which comprises a carboxyl-modified product of a hydrolyzed polymer obtained by hydrolyzing a copolymer derived from a vinyl ester of a saturated monocarboxylic acid and another vinyl monomer polymerizable therewith and a compound having not less than two epoxy groups in the molecule.

There have been already known powdery coating compositions which comprise a polymer having carboxyl groups obtained by copolymerizing acrylic acid or methacrylic acid with other polymerizable vinyl monomers and an epoxy compound (for example, Japanese Published Unexamined Patent Application No. 40344/1974), and powdery compositions which comprise a polymer having carboxyl groups produced by allowing a dicarboxylic acid anhydride to add to a polymer obtained by the copolymerization of a hydroxyalkyl(meth)acrylate and other polymerizable vinyl monomers and an epoxy compound (for example, U.S. Pat. No. 3,935,138). However, when these compositions are put into practice as a powdery coating composition, it is necessary to set the melting point of the polymer component within range, which limitation results in the deterioration in the toughness, the flexibility and the impact resistance of the resulting coating film. In addition, there has been recently proposed powdery coating compositions produced by mixing a hydrolyzed ethylene/vinyl ester copolymer or a carboxyl-modified product thereof with an organic polyisocyanate protected with a blocking agent, such as ε-caprolactam, but these compositions, when baked, liberate the blocking agent as a volatile, which gives rise to environment-hygienic problems such as air pollution. Therefore, there is a strong demand for the development of coating compositions to replace these compositions.

The present inventors, after extensive research have discovered a composition composed of a particular polymer having carboxyl groups and an epoxy compound that meets the various requisites for powder coating compositions, and have found that such composition, when baked, yields coating films which possess tough physical properties. These properties include excellent impact resistance, chemical resistance and water resistance, especially resistance to salt water (salt spray exposure), without evolving any volatile gas such as volatile blocking agents, etc. when baked. Such findings have led to the completion of the present invention.

Thus, the present invention deals with a powdery coating composition which comprises (A) a carboxyl-modified product of a hydrolyzed polymer obtained by hydrolyzing a copolymer derived from a vinyl ester of a saturated monocarboxylic acid and a vinyl monomer polymerizable therewith and (B) a compound having not less than two epoxy groups in the molecule.

The carboxyl-modified product (A) of the present invention includes a carboxyl-containing product prepared by a method which comprises (a) grafting a hydrolyzed polymer obtained by hydrolyzing the copolymer derived from a vinyl ester of a saturated monocarboxylic acid, such as vinyl acetate and vinyl propionate, particularly vinyl acetate, and polymerizable vinyl monomers, such as ethylene, propylene, butadiene, isoprene, chloroprene, styrene, methylstyrene, chlorostyrene, vinyl chloride, vinyl bromide, vinyl fluoride, vinylidene chloride, acrylonitrile and methyl vinyl ether, particularly ethylene, with a carboxyl-containing vinyl monomer such as acrylic acid, methacrylic acid and maleic anhydride, preferably acrylic acid; (b) esterifying said hydrolyzed polymer with an aliphatic, alicyclic or aromatic dicarboxylic acid anhydride having up to 10 carbon atoms, such as succinic anhydride, maleic anhydride, fumaric anhydride, citraconic anhydride, itaconic anhydride, 3,6-endomethylene tetrahydrophthalic anhydride, 4-methyl-3,6-endomethylene tetrahydrophthalic anhydride, chlorendic anhydride, phthalic anhydride, hexahydrophthalic anhydride, methylhexahydrophthalic anhydride, tetrahydrophthalic anhydride and methyltetrahydrophthalic anhydride, preferably succinic anhydride, phthalic anhydride, hexahydrophthalic anhydride, tetrahydrophthalic anhydride, methylhexahydrophthalic anhydride or methyltetrahydrophthalic anhydride; or (c) grafting said hydrolyzed polymer with a carboxyl-containing vinyl monomer as defined above and then further esterifying the grafted polymer with a dicarboxylic acid anhydride mentioned above. The carboxyl-modified products, thus prepared, have an acid value of 10 mgKOH/g to 200 mgKOH/g, preferably 20 mgKOH/g to 150 mgKOH/g, and the products have a softening point of not lower than about 40° C. are conveniently employed in this invention.

Such modified products can be produced for example by the procedure as described below.

A copolymer derived from a vinyl ester of a saturated monocarboxylic acid and another vinyl monomer polymerizable therewith is subjected to a hydrolysis reaction. The particularly preferred example of such a copolymer includes a copolymer of vinyl acetate and ethylene, i.e. an ethylenevinyl acetate copolymer, generally with the ratio of both monomers being within the range of about 5 mole % to 50 mole % of the former and of about 50 mole % to 95 mole % of the latter, preferably within the range of about 15 mole % to 40 mole % of the former to about 60 mole % to 85 mole % of the latter. These copolymers are known polymers and provided with the known polymerization procedures. The hydrolysis of said copolymer can be performed by the known procedures (for example, U.S. Pat. No. 2,386,347). For example the reaction can be conducted in a system consisting of a low-boiling alcohol such as methanol, ethanol and propanol and an alkali catalyst such as sodium methylate and sodium hydroxide, and may be carried out in the presence of an organic solvent such as benzene, toluene and xylene. The hydrolysis percentage is in the range of about 10% to about 100% to the total acetate groups of the copolymer, preferably in the range of about 60% to about 95%. Conditions for the hydrolysis reaction vary a little with the desired hydrolysis percentage but, normally, the hydrolysis can be conducted at a temperature of 10° C. to 100° C. for a period from 10 minutes to 180 minutes.

The hydrolyzed polymer thus obtained is then subjected to carboxyl-modification reaction. The carboxyl-modification reaction is conducted by way of a method which comprises reacting the hydrolyzed polymer with a carboxyl-containing vinyl monomer or/and reacting the hydrolyzed polymer with a dicarboxylic acid anhydride. In the case of grafting the hydrolyzed copolymer with a carboxyl-containing vinyl monomer, such reaction is normally conducted by letting a radical-forming substance coexist with the starting mixture in the presence of, or in the absence of, a suitable solvent (e.g., aliphatic hydrocarbons such as hexane and heptane, alicyclic hydrocarbons such as cyclohexane, aromatic hydrocarbons such as benzene, toluene and xylene, halogenated hydrocarbons such as carbon tetrachloride, trichloroethylene, tetrachloroethylene and chlorobenzene, and others such as butanol, methyl ethyl ketone, methyl isobutyl ketone, dioxane and cyclohexanone), followed by heating. The radical-forming substance usable herein includes the substances capable of easily decomposing at temperature capable of effecting graft polymerization to thereby form radicals, which are exemplified by organic peroxides such as benzoyl peroxide, lauroyl peroxide and dicumyl peroxide, and nitrogen-containing compounds such as $\alpha,\alpha'$-azobisisobutylonitrile. These radical-forming substances are employed in quantities of about 0.05 weight % to 3 weight %, preferably about 0.1 weight % to 1 weight %, against the hydrolyzed polymer. The heating temperature varies with the types of a carboxyl-containing vinyl monomers and solvents employed, but it is within the range from about 50° C. to about 150° C., and the heating time is from about 0.1 hour to about 5 hours. It should be noted that an amount of a carboxyl-containing vinyl monomer is not less than about 2 weight %, preferably in the range of 2 weight % to 15 weight %, against the hydrolyzed polymer. It may be, however, less than 2 weight % in the case of modifying the grafting polymer further with a dicarboxylic acid anhydride.

In the case of esterifying the hydrolyzed polymer with a dicarboxylic acid anhydride, such reaction is conducted by heating the starting mixture in the presence of, or in the absence of, a suitable solvent at about 50° C. to 150° C. for about 0.1 hour to 5 hours. The amount of the dicarboxylic acid anhydride is not less than about 2 weight %, preferably in the range of 3 weight % to 35 weight %, in relationship to the hydrolyzed polymer. In the above reaction, the acid anhydride is assumed to undergo a ring-opening with OH groups of the hydrolyzed polymer to form the structure

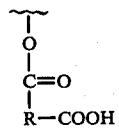

(wherein R is a hydrocarbon residue)

The carboxyl-modified product (A) of the present invention also includes a mixture capable of producing a carboxyl-modified product under elevated temperatures, for example, in the course of baking. As examples of such mixture, there may be mentioned a mixture which is composed of the hydrolyzed polymer and one or more kinds of dicarboxylic acid anhydrides, which are defined above, such as hexahydrophthalic anhydride; mixtures which are composed of a carboxyl-modified product obtained by grafting the hydrolyzed polymer with carboxyl-containing vinyl monomers, such as acrylic acid and a dicarboxylic acid anhydride as defined above, which can easily form carboxyl-modified products, under heating conditions. The ratio of the two components are usually chosen from the ratio as specified above.

Referring to the compounds having not less than two epoxy groups in the molecule, there may be mentioned an epoxy resin having two or more epoxy groups, among which an epoxy resin having two or three epoxy groups is most useful.

Examples of the epoxy resin include, for example, bisphenol A type epoxy resins, hydrogenated bisphenol A type epoxy resins, novolak type epoxy resins, glycidyl ether epoxy resins such as polyglycidyl ethers of polyalkylene glycols (e.g. diglycidyl ether of neopentyl glycol), glycidyl ester epoxy resins such as polyglycidyl esters of polycarboxylic acids (e.g. triglycidyl isocyanurate, diglycidyl phthalate and diglycidyl hexahydrophthalate) and cycloaliphatic type epoxy resins such as 3,4-epoxycyclohexyl methyl (3,4-epoxycyclohexane)-carboxylate and bis(3,4-epoxy-6-methylcyclohexylmethyl)adipate, which are generally known and have two or three epoxy groups.

As another useful compound having not less than two epoxy groups in the molecule, there may be mentioned an epoxy-containing resin obtained by reacting the above-mentioned epoxy resin with a polyester polycarboxylic acid; a polyglycidyl ester of a polyester polycarboxylic acid; and a polyglycidyl ether of a polyester polyol. These epoxy-containing resins are particularly useful, for they have good compatibility with carboxyl-modified products to produce high gloss coating films. Furthermore, in the case that the above-mentioned epoxy resin is in a liquid form, it can be changed into a solid form by modifying it with a polyester polycarboxylic acid.

As to the polyester polycarboxylic acids and polyester polyols usable in the present invention, there may be mentioned polyester polycarboxylic acids and polyester polyols having a molecular weight (MW) of ca. 400 to ca. 10,000, preferably of ca. 500 to ca. 3,000. These carboxyl-terminated or hydroxyl-terminated polyesters can be produced through an esterification reaction by conventional procedures.

Examples of the polyesters usable in the present invention include those obtained by reacting a di- or tricarboxylic acids (or their anhydrides) such as maleic acid (anhydride), succinic acid (anhydride), adipic acid, fumaric acid, phthalic acid (anhydride), terephthalic acid, isophthalic acid, methyltetrahydrophthalic acid (anhydride), tetrahydrophthalic acid (anhydride), sebacic acid, dodecanic acid, azelaic acid, glutaric acid, trimellitic acid (anhydride), hexahydrophthalic acid (anhydride), methylhexahydrophthalic acid (anhydride) and the like with di- or trihydroxy alcohols such as ethylene glycol, propylene glycol, butylene glycol, hexylene glycol, decanediol, neopentyl glycol, glycerol, trimethylolpropane, 1,4-cyclohexanedimethanol, neopentyl glycol ester of hydroxypivalic acid, 1,4-cyclohexanediol, hydrogenated bisphenol A and the like.

Especially preferred polyesters are those prepared by employing succinic acid, hexahydrophthalic acid, tetrahydrophthalic acid, methylhexahydrophthalic acid, methyltetrahydrophthalic acid and/or anhydrides thereof as acid component and neopentyl glycol, neopentyl glycol ester of hydroxypivalic acid, 1,4-cyclohexanedimethanol, hydrogenated bisphenol A and/or trimethylolpropane as the hydroxy component, the total amount of said acid and hydroxy components being more than 60 weight % to that of the whole acid and hydroxy components for the polyester.

Among the above epoxy resins, solid-formed resins are usable as the compound containing epoxy groups of the present invention, but even liquid epoxy resins, by reacting them with the above-mentioned polyester polycarboxylic acids, can be converted into solid epoxy compounds, which are favorably usable in the present invention.

Specifically the epoxy-containing resins which are obtained by reacting, for example, hydrogenated bisphenol A type epoxy resin, diglycidyl hexahydrophthalate or diglycidyl ether of neopentyl glycol with the above-mentioned polyester polycarboxylic acids are in a solid form and therefore are useful as the component in the compositions of the present invention, which cause no blocking of powder and give excellent coating-film performances. Thus, the compositions exhibit excellent resistance and a glossy appearance and are non-yellowing. In addition to the above compounds having not less than two epoxy groups in the molecule, compounds having one epoxy group may be employable in conjunction, if necessary.

The ratio (carboxyl group)/(epoxy group) of the carboxyl-modified product and a compound having not less than two epoxy groups in the molecule can preferably be normally within the range of 0.2 to 5.0 and especially preferably 0.3 to 2.0. Furthermore, auxiliaries, fillers, levelling agents, defoaming agents, anti-blocking agents, catalysts, antioxidants, pigments, dyestuffs, etc. can be added, if necessary.

Further, if necessary, other carboxyl-containing compounds may be added. Such carboxyl-containing compounds may be the ones obtained by the addition of dicarboxylic acid anhydrides to known hydroxyl-containing acrylic polyols or to polyester polyols, and use can be made of carboxyl-containing polymers obtained by copolymerizing acrylic acid, methacrylic acid, etc., carboxyl-terminated polyester resins, and others, as well. Addition of such resins permits retention of the toughness of the coating films, which is the characteristic of the present invention, and further improvement of the hardness of the resulting coating film.

Preparation of powdery coating compositions is conducted by way of methods known per se. For example, the carboxyl-modified product and the epoxy-containing compound, together with a variety of additives, are melt-kneaded, by means of an extruder, and then pulverized or freeze-pulverized, if necessary, thereby yielding a powdery coating composition. After kneading two components by heated rolls, the kneaded material may be crushed. Furthermore, after each component is dissolved or dispersed in a solvent, both solutions or dispensions are mixed with each other, followed by spray-drying or freeze-drying to convert them into a powder or by removing the solvent by heating under reduced pressure and then crushing the solid into a powder. Further, each component is crushed into powder and the powdery component is mixed with each other to produce a powdery coating composition. As to the particle size of the powder after crushing, a powder with 5 to 500 microns are normally employed. In order to make the particle size distribution narrower, larger-sized powder or smaller-sized powder or both powders may be eliminated. Application of the powdery composition on the surface of a substrate is conducted with the use of the procedures known per se. For example, coating can be effected by means of an electrostatic powder applying machine, and an electrical-field curtain type powder applying apparatus, etc. In addition, fluidized dipping and flame spraying methods can also be employed. Following the application of powders, the coating films may be cured by heating in a heating furnace. Baking conditions vary with the presence or absence, of a catalyst, and normally the baking conditions of the coated substrate are carried out at a temperature of 130° to 220° C. for a period of 10 to 60 minutes. Baking at higher temperatures can shorten the baking time.

The powder coating compositions according to the present invention can be used in a wide variety of applications such as for coating metals, glass, concrete, ceramics and tiles. When aliphatic or alicyclic compounds containing epoxy group are used, the resulting coating films exhibit excellent adhesiveness, weather resistance, water resistance, especially resistance to salt water, chemical resistance and impact resistance, which make the compositions especially suited for application in guardrails, outdoor playing equipment, fences, coatings to prevent bottles containing carbonated drinks from exploding, etc. Further, in the case of using of aromatic compounds containing epoxy groups, the resulting coating films display excellent chemical resistance, impact resistance and adhesiveness, thus indicating that the compositions are particuraly suitable for use as anticorrosion resin linings for iron pipes, etc., and as coatings for rust prevention of iron frames and indoor articles, etc.

EXAMPLE 1

In 200 g of xylene was dissolved 100 g of a hydrolyzed polymer[hydrolysis percentage 90%: melt index (MI) 85 g/10 min.]obtained by hydrolyzing an ethylene-vinyl acetate copolymer [vinyl acetate content 28 weight %: MI 150 g/10 min.]. To the solution was added 25.7 g of hexahydrophthalic anhydride and the reaction was conducted at 100° to 105° C. for 60 minutes. Then, 500 g of methanol was added to the reaction solution to allow the reaction product to precipitate, and the precipitate was filtered out, followed by drying under reduced pressure. 100 g of the carboxyl-modified product thus obtained (MI 45.2: m.p. 94°–97° C.: acid value 70.6) was melt-mixed with B 100 g of an epoxy-containing resin obtained by reacting 75 parts of carboxyl-terminated polyester with acid value of 75.1, which was prepared by the reaction of hydrogenated bisphenol A and hexahydrophthalic anhydride, with 50 parts of diglycidyl ether of hydrogenated bisphenol A, and the melted material was subjected to freeze-crushing to produce powder with an average particle size of 98$\mu$. The powdery composition was electrostatically applied on an iron plate, which was placed in a baking furnace at 200° C. for 30 minutes for curing. The physical properties of the resulting coating film were as follows:

| | |
|---|---|
| Hardness (pencil) | 4B |
| Cross-cut adhesion test | 100/100 |
| Impact test | Passing the rating of ½', 1 kg and 50 cm |
| Flexural property | Passing 2 m/m |
| Erichsen | Passing 8 m/m |
| Ethyl acetate spot test | Not affected |
| Weather-O-meter (1000 hrs) | Not affected |
| Water resistance test (at 80° C. for 24 hrs.) | Not injured |
| Salt spraying test (for 14 days) | Not injured |

| Film thickness | 100μ |

Further application on a glass plate of the above composition, followed by baking for curing (200° C., for 30 minutes), afforded the colorless, transparent glossy coating film of resin.

EXAMPLE 2

By the same procedure as described in Example 1, 49 g of phthalic anhydride was reacted with 100 g of a hydrolyzed polymer (hydrolysis percentage 90%; MI 85 g/10 min.) obtained by hydrolyzing an ethylene-vinyl acetate copolymer (vinyl acetate content 28 weight %; MI 150 g/10 min.). 100 parts of the carboxyl-modified product (acid value 127) thus obtained was melt-mixed with 25 parts of an epichlorohydrin-bisphenol A type epoxy resin (epoxy equivalent 475) (Epicoat 1001 ®) and 0.1 part of benzyl-dimethylamine, followed by freeze-crushing. The resulting powdery composition was applied on a tin plate. which was baked at 180° C. for 30 minutes for curing. By the above procedure, a flexible coating film was obtained.

| Breaking strength | 254 kg/cm$^2$ |
| Elongation | 190% |

EXAMPLE 3

A hydrolyzed polymer obtained by hydrolyzing (hydrolysis percentage 85%) an ethylene-vinyl acetate copolymer (vinyl acetate content 28 weight %; MI 150 g/10 min.) was grafted with 0.5 weight % of acrylic acid. 100 parts of the carboxyl-modified product thus obtained was melt-mixed with 25 parts of hexahydrophthalic anhydride and 50 parts of the epoxy-containing resin as employed in Example 1, followed by freeze crushing to thereby produce powder with average particle size of 110μ. The composition was applied on a glass bottle, which was baked at 200° C. for 30 minutes, thus yielding a transparent, resin-coated glass bottle. By applying an impact force on the bottle put under an inner pressure of 3.5 kg/cm$^2$, it was broken whereby the bottle burst without scattering pieces of broken glass and almost retained its original shape.

EXAMPLE 4

A hydrolyzed polymer (hydrolysis percentage 70%) obtained by hydrolyzing an ethylene-vinyl acetate copolymer (vinyl acetate content 28 weight %: MI 150 g/10 min.) was grafted with 4 weight % of acrylic acid to thereby produce a carboxyl-modified product (MI 65 g/10 min.). 100 parts of the product thus obtained was melt-mixed with 30 parts of a diglycidyl ether of a polyester polyol composed of 3 moles of hydrogenated bisphenol A and 2 moles of methylhexahydrophthalic anhydride, followed by freeze-crushing. Then, the resulting powdery composition was electrostatically applied on a glass plate, followed by baking at 180° C. for 30 minutes for curing. The physical properties of the coating film are as follows:

| Appearance of the coating film | Colorless, transparent |
| Hardness | 6B |
| Elongation | 205% |
| Breaking strength | 230 kg/cm$^2$ |
| Immersion in hot water (at | Not injured |
| 90° C. for 2 hrs.) | |

What is claimed is:
1. A powdery coating composition which consists essentially of:
   (A) a carboxyl-modified product having an acid value of 20 to 150 mg KOH/g which is prepared by grafting a hydrolyzed polymer with a carboxyl-containing vinyl monomer, or by esterifying a hydrolyzed polymer with an aliphatic, alicyclic or aromatic dicarboxylic acid anhydride having up to 10 carbon atoms, or by grafting a hydrolyzed polymer with a carboxyl-containing vinyl polymer and then esterifying a hydrolyzed polymer with an aliphatic, alicyclic or aromatic dicarboxylic acid anhydride having up to 10 carbon atoms; said hydrolyzed polymer being obtained by hydrolyzing an ethylene-vinyl acetate copolymer, the ratio of ethylene and vinyl acetate being within the range of about 5 mole % to 50 mole % of vinyl acetate, and the hydrolysis percentage of the hydrolyzed polymer being in the range of about 10% to 100% in respect to the total acetate groups of the copolymer; and
   (B) a compound having not less than two epoxy groups in the molecule; the ratio of the carboxyl groups/epoxy groups of the carboxyl-modified product (A) and the compound having not less than two epoxy groups in the molecule (B) being within the range of 0.2 to 5.0.
2. The powdery coating composition as claimed in claim 1, wherein the carboxyl-modified product is one prepared by grafting said hydrolyzed polymer with a carboxyl-containing vinyl monomer.
3. A powdery coating composition as claimed in claim 1, wherein the carboxyl-containing vinyl monomer is acrylic acid.
4. A powdery coating composition as claimed in claim 1, wherein the carboxyl-modified product is one prepared by esterifying said hydrolyzed polymer with an aliphatic, alicyclic or aromatic dicarboxylic acid anhydride having up to 10 carbon atoms.
5. A powdery coating composition as claimed in claim 4, wherein the alicyclic dicarboxylic acid anhydride is hexahydrophthalic anhydride.
6. A powdery coating composition as claimed in claim 1, wherein the compound (B) is a bisphenol A type epoxy resin.
7. A powdery coating composition as claimed in claim 1, wherein the compound (B) is a polyglycidyl ester of a polyester polycarboxylic acid.
8. A powdery coating composition as claimed in claim 1, wherein the compound (B) is an epoxy-containing resin obtained by reacting a carboxyl-terminated polyester which was prepared by the reaction of hydrogenated bisphenol A and hexahydrophthalic anhydride with diglycidyl ether of hydrogenated bisphenol A.
9. A powdery coating composition as claimed in claim 1, wherein the compound (B) is a polyglycidyl ether of a polyester polyol.
10. A powdery coating composition as claimed in claim 1, wherein the compound (B) is a diglycidyl ether of a polyester polyol composed of hydrogenated bisphenol A and methylhexahydrophthalic anhydride.
11. A powdery coating composition as claimed in claim 1, wherein the ratio of carboxyl groups/epoxy groups of the carboxyl-modified product and the compound having not less than two epoxy groups in the molecule is within the range of 0.3 to 2.

* * * * *